April 7, 1959   H. H. SISSON ET AL   2,880,510
APPARATUS FOR LOCATING THE POSITION AND DIP OF
REFLECTING STRATA AND FOR PLOTTING RAY PATHS
Filed Feb. 3, 1955   4 Sheets-Sheet 1
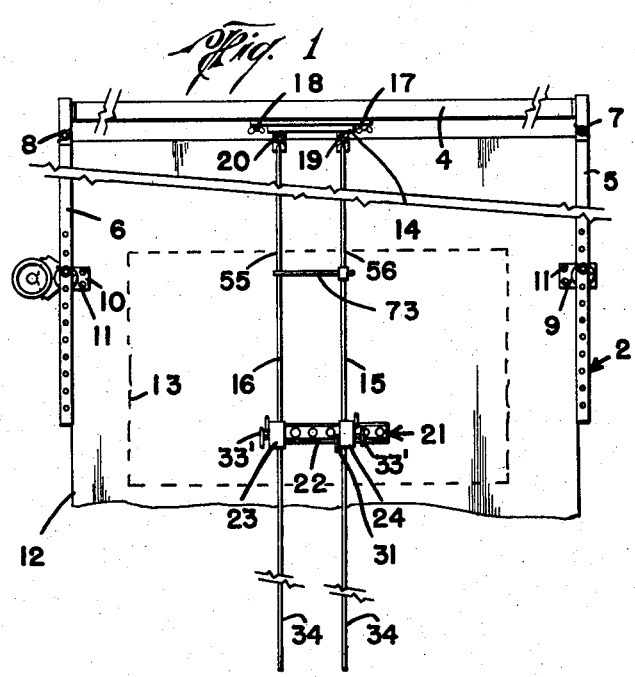
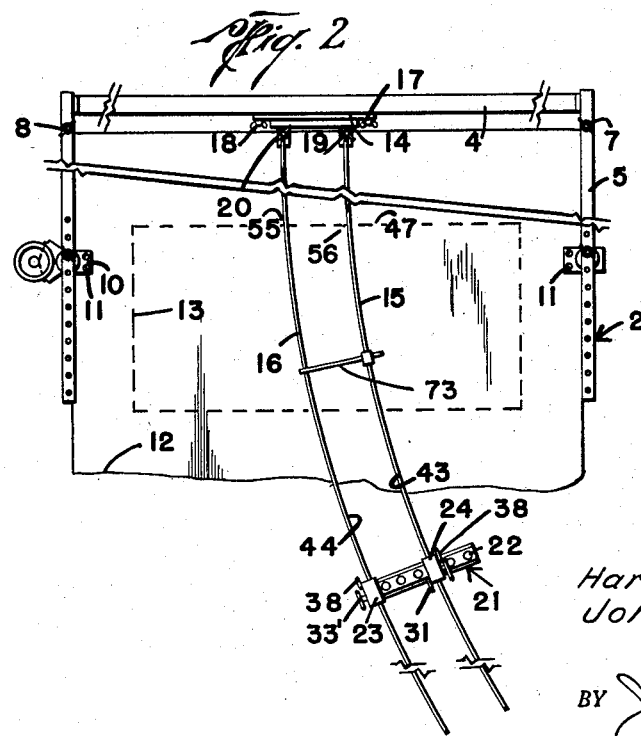
Harry H. Sisson
John C. Calkins
INVENTORS
BY Jacks W. Hayden
ATTORNEY April 7, 1959  H. H. SISSON ET AL  2,880,510
APPARATUS FOR LOCATING THE POSITION AND DIP OF
REFLECTING STRATA AND FOR PLOTTING RAY PATHS
Filed Feb. 3, 1955  4 Sheets-Sheet 2
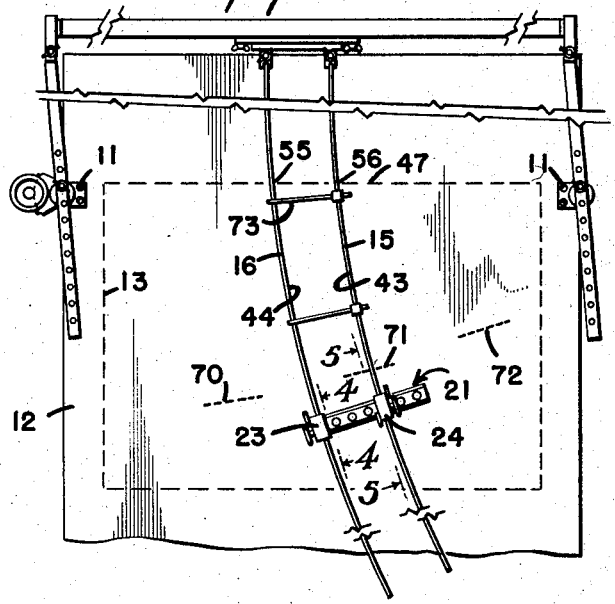
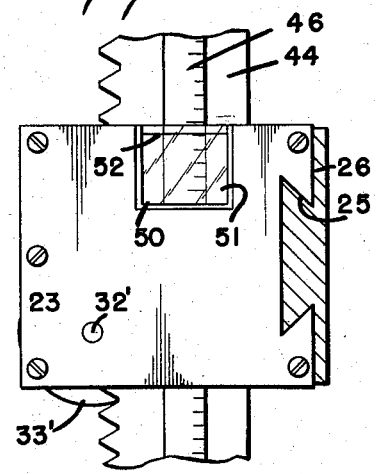
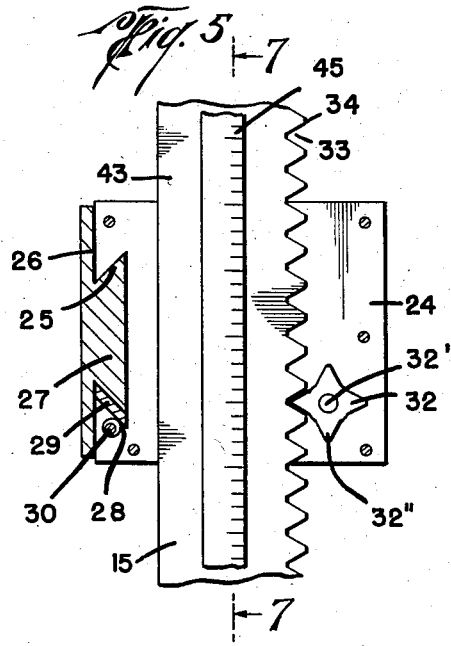
Harry H. Sisson
John C. Calkins
INVENTORS
BY *Jacks W. Hayden*
ATTORNEY

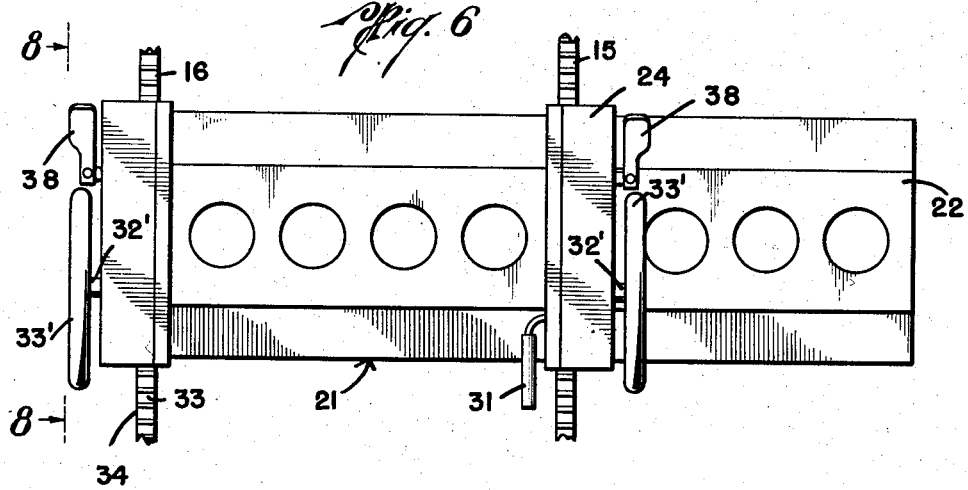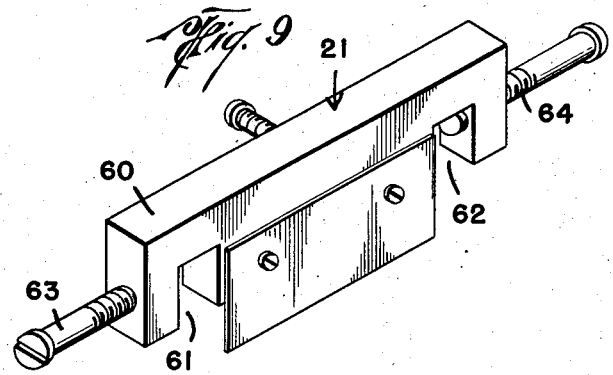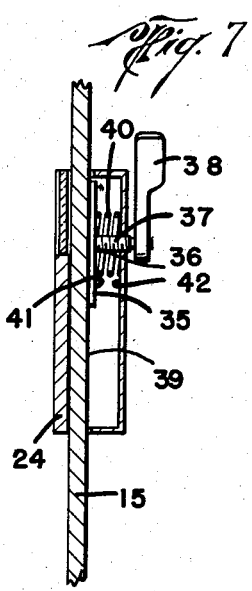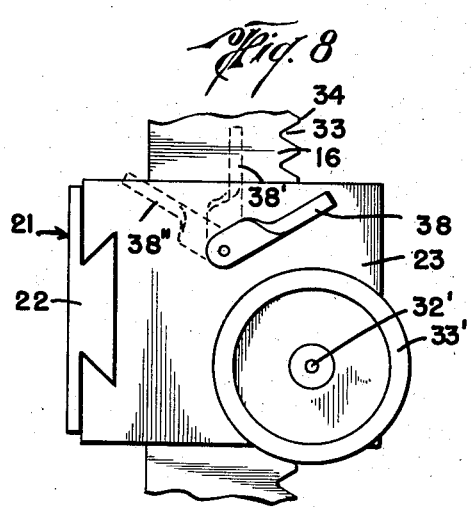
Harry H. Sisson
John C. Calkins
INVENTORS
BY Jack W. Hayden
ATTORNEY Harry H. Sisson
John C. Calkins
INVENTOR.

United States Patent Office 2,880,510
Patented Apr. 7, 1959

2,880,510

APPARATUS FOR LOCATING THE POSITION AND DIP OF REFLECTING STRATA AND FOR PLOTTING RAY PATHS

Harry H. Sisson and John C. Calkins, Houston, Tex., assignors to Robert H. Ray Company, a partnership Application February 3, 1955, Serial No. 485,889

17 Claims. (Cl. 33—1)

The present invention relates to an apparatus or instrument for plotting seismic data and more particularly to a device which locates the depth and angle or dip of reflecting subsurface strata and which plots ray paths.

When a seismic survey of any area has been completed it is desirable to prepare topographical subsurface maps. The contours of the subsurface strata, as indicated on such map, may yield valuable information relative to the probability of the presence of petroliferous or other deposits. In order to prepare such maps, it is necessary to determine the depth and angle, or dip, of the subsurface strata. Such information heretofore has been obtained by extensive calculation with the aid of equations or graphic methods, all of which are tedious and time consuming.

Apparatus has also been proposed whereby the location and dip of subsurface strata relative to datum points or shot points may be plotted. However, such apparatus functions on certain assumptions, which assumptions, from a practical point of view are not accurate. Therefore, the resulting map which is plotted with the aid of such apparatus includes inherent errors and in effect, gives false indications as to the true position of the subsurface strata, both as to depth and as to angle or slope.

Heretofore, it has been necessary to plot ray paths by use of a mathematical calculation. Such procedure is, of course, time consuming and subject to whatever errors may arise by using the mathematical calculation procedure.

The present invention overcomes the above difficulties and provides an apparatus which correctly solves the angle and location determining problem of subsurface strata, as well as providing an apparatus for plotting ray paths.

The present invention provides an apparatus which correlates the reflection time and depth of a plurality of datum points, or shot points, of a seismic survey to correctly and more accurately locate the position and angle of various subsurface strata which gave rise to the reflection times.

The invention also provides an apparatus for plotting seismic ray paths.

Other objects and advantages of the present invention will become more readily apparent from a consideration of the following description and drawings, wherein:

Fig. 1 is a plan view of an apparatus embodying the preferred form of the invention;

Fig. 2 is a plan view of the apparatus illustrated in Fig. 1 in a different position;

Fig. 3 is a plan view illustrating the apparatus of Figs. 1 and 2 in another position;

Fig. 4 is a side elevational view on the line 4—4 of Fig. 3;

Fig. 5 is a sectional view on the line 5—5 of Fig. 3;

Fig. 6 is an enlarged plan view illustrating the slide member used in the invention;

Fig. 7 is a sectional view on the line 7—7 of Fig. 5, showing one form of the means for clamping the slide member relative to the plotter arms;

Fig. 8 is a side view on the line 8—8 of Fig. 6;

Fig. 9 is a perspective view of a modified form of the slide member illustrated in Fig. 6;

Figure 10:
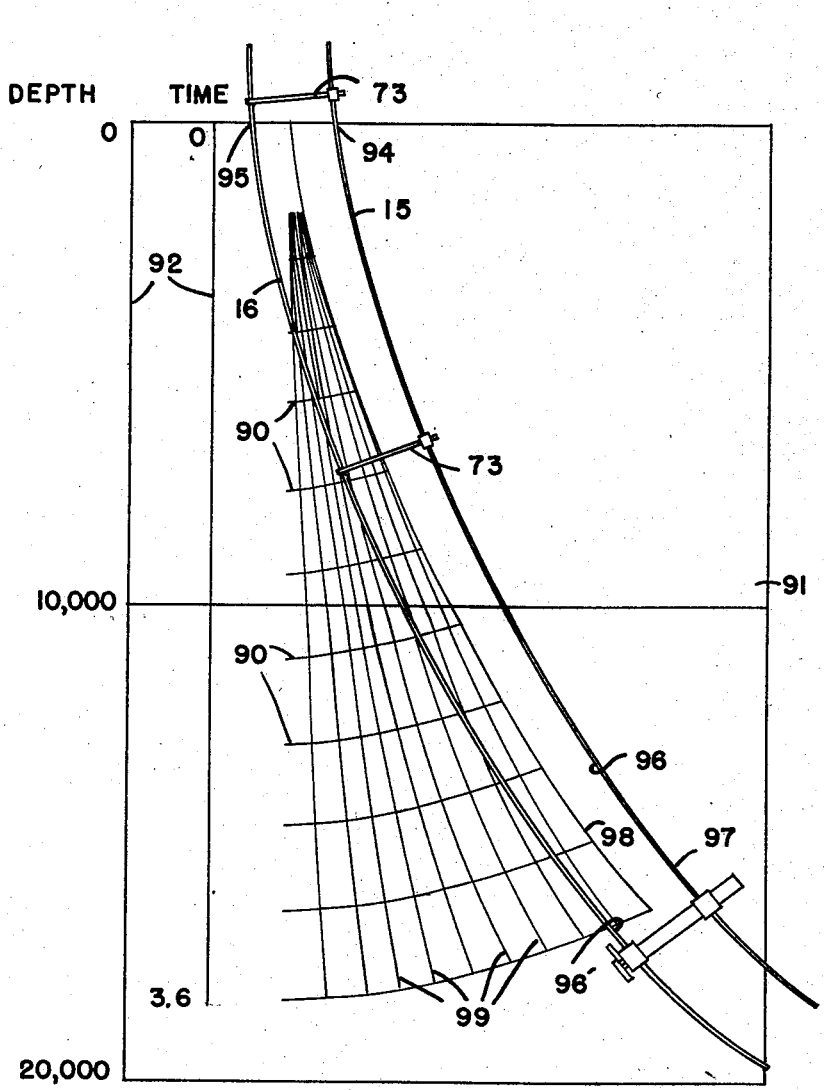
Fig. 10 illustrates the apparatus in position for plotting ray paths.
Figure 11:
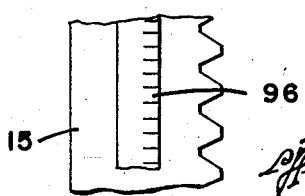
Fig. 11 illustrates a depth scale which may be used on the plotter arms when the device is used to plot seismic ray paths.

Referring to Fig. 1, the invention is denoted generally by the numeral 2 wherein the preferred embodiment of the apparatus is illustrated. Such instrument or apparatus includes the frame 4 which is supported on the bars 5 and 6 which may be pivotally secured to the frame 4 by means of the wing nuts 7 and 8 respectively. The bars 5 and 6 are rotatably mounted in supports 9 and 10, which supports are provided with suitable means such as thumb screws 11, whereby the instrument may be secured in position on a drafting board 12 or the like, as illustrated in Figs. 1, 2 and 3 of the drawings. The instrument is used in connection with drawing paper such as coordinate paper shown in dotted line at 13 as being positioned on the drawing board 12. The coordinate paper is divided in the usual manner with vertical scales representing depth (not shown) and a horizontal line as illustrated at 47 in Fig. 2 for indicating a shot plane or datum plane adjacent the earth's surface over which a seismic survey has been taken.

A carriage 14 is slidably mounted in the frame 4 and is provided with plotter arms 15 and 16 which are slidable relative to the carriage 14. The carriage 14 may be positioned in any location in the frame 4 by means of the wing nuts 17 and 18 and the plotter arms 15 and 16 may be secured or fixed to the carriage by means of the wing nuts 19 and 20.

The plotter arms 15 and 16 are formed of flexible material such as metal or the like, whereby they may be bent, flexed or elastically distorted along their longitudinal axis as illustrated in Figs. 2 and 3 of the drawings as will be more fully described hereinafter. It will be noted from the drawings that the arms 15 and 16 are rectangular in shape so that when they bend, they form arcs of circles. This shape of the arms permits the arms to bend to simulate the ray paths from each reference point corresponding to each arm respectively. The travel of sound in the earth can be expressed, in most instances, in terms of the linear function, $V = V_0 + kZ$ and therefore when the arms 15 and 16 are bent or flexed as described hereinafter, they simulate the ray path from each reference or datum point 56 and 55 respectively.

In those instances where it is necessary to express the travel of sound in terms other than the above linear function, the arms 15 and 16 may be shaped so that when bent or flexed, they will simulate the function expressed by such equation. However, as previously mentioned, a linear function is satisfactory for probably 90% of the cases and the arms 15 and 16, in such instances will be rectangular in cross-sectional shape to obtain the desired results.

The plotter arms 15 and 16 may be spaced one from the other a distance corresponding with the separation distance between the two shot points or datum points such as illustrated at 55 and 56. A means is illustrated generally at 21 which may be moved longitudinally relative to each of the plotter arms 15 and 16. The means 21 may be referred to as the plotter arm slide and includes the base portion 22 which receives the upstanding portions 23 and 24 which engage each of plotter arms 16 and 15 respectively whereby such arms may be bent to properly position means 21 as will be more fully described hereinafter.

The portions 23 and 24 are provided with a dovetail groove 25 in the bottom surface 26 thereof so as to be slidably supported by means of the dovetail 27 on the top of base portion 22 of plotter arm slide 21. Any suitable form of movable bearing means may be mounted in the bottom surface of base portion 22 so as to facilitate movement of the means 21 on the plotting board. If desired, one of the upstanding portions, such as illustrated at 23 may be secured to the base portion 22 by any suitable means such as bolts or the like and the upstanding portion 24 may be slidably mounted on the base portion in the manner above described in order to position the arms 15 and 16 relative to each other in accordance with the separation distance between the shot points. An eccentric 28 extends adjacent the dovetail groove 25 on one side thereof and is adapted to engage plate 29 positioned in groove 25 whereby the upstanding portion 24 may be locked in position on the base member 22 after the separation distance of arms 15 and 16 has been established. The eccentric 28 is mounted on shaft 30 to which is secured lever 31 whereby the eccentric may be rotated to engage the plate 29 and thereby lock the upstanding portion 24 on bar 22 or it may be disengaged relative to plate 29 to allow sliding movement of member 24 along the base 22.

The members 23 and 24 of plotter arm slide 21 are, as previously mentioned, illustrated in the drawings as being slidably engaged on each of the arms 16 and 15 respectively and any suitable means may be utilized to effect a sliding engagement between the members 23 and 24 and their respectively engaged arms 16 and 15, but which means also permits the members 23 and 24 to be locked or located at any given position along the bars 15 and 16. Each of the members 23 and 24 are provided with openings for receiving the plotter arms 15 and 16 therethrough.

A form of one such means for accommodating relative movement between the members 23 and 24 and arms 15 and 16 is illustrated in the drawings. A rotatable wheel 32 is mounted in each of the members 23 and 24 on shaft or axle 32' and is provided with projections 32'' for engaging in the grooves 33 formed on the upstanding edge 34 of each of members 15 and 16. The shaft 32' extends laterally through each of the members 23 and 24 and is provided with a wheel 33' on its outer projecting end whereby rotation of the wheel 32 and subsequent movement of the members 23 and 24 along arms 15 and 16 may be effected. The grooves 33 may extend along such members for a substantial distance to accommodate relative movement between the plotter arm slide 21 and the arms 15 and 16 as desired during operation of the instrument. A means for locking or locating members 23 and 24 in position relative to each arm 16 and 15 is illustrated in Fig. 7 of the drawings.

In the form illustrated, a plate 35 is shown as being engaged on the inner end 36 of shaft 37. The shaft 37 has connected to its outer end the operating lever 38 whereby the plate may be moved towards and away from the side surface 39 of each of the arms 15 and 16 so as to lock the members 23 and 24 or release them relative to their respective arms. A spring means 40 is provided which abuts the rear surface 41 of the plate and the inner surface 42 of member 24 so as to tend to urge the plate 35 into slight pressure contact with the side surface 39. The lever 38 is shown in Fig. 8 as having been turned so that the plate 35 is positioned against arm 15 to lock such arm and the upstanding member together. Position 38' shown in dotted line in Fig. 8 illustrates lever 38 moved to "operating" position, which permits relative movement between the upstanding portion and the plotter arms, and position 38'' illustrates lever 38 mounted in "neutral" position.

Each of the arms 15 and 16 is provided on its inner side surface 43 and 44 respectively with time-depth, or distance scales 45 and 46 which extend from zero at a point coinciding with the reference line or datum plane indicated in dotted line at 47 on the coordinate paper 13 in Fig. 3. Such scales are arrived at by well known means as will be discussed hereinafter.

Each of the members 23 and 24 is provided with a cut-out portion 50 in which is mounted a plastic window 51 with a scribe line 52 thereon, whereby the members 23 and 24 may be positioned with respect to the scales 45, 46 as will be more fully discussed hereinafter.

In using the instrument to locate the position and dip of strata, it is mounted on a drafting table as illustrated in Fig. 3 by means of the screws 11. The bars 5 and 6 are raised or lowered until the frame or bar 4 is spaced above the reference or datum line 47, a distance depending upon the constants in the velocity distribution function of the earth in the area under study. Such constants may be arrived at by any suitable well known method such as by measuring the uphole time of a seismic event in the given area under study. From such information the velocity variation of sound with depth in the earth in the general area under consideration may be determined.

In actual practice, the distance of the arm 4 above the datum plane 47 will correspond to the ratio of $V_0$ to $k$ in the equation $V = V_0 + kZ$, where $V_0$ equal the instantaneous speed near the earth's surface, $k$ represents the rate of acceleration and $Z$ equal depth.

By detonating successive charges near the surface in a well bore in the area under study and measuring the time for the sound to travel from the surface charge to a seismometer at various successive positions in the well bore, a graph of time vs. depth may be plotted which indicates the velocity variation of sound with depth in the earth in the area under study.

Also, from such graph, the time-depth scales 45 and 46 may be made and then positioned on each of the arms 15 and 16. The scales are positioned on the arms so that zero depth corresponds with the reference line 47. The time-depth scales are not shown in detail as they are well known in the art.

The plotter arms 15 and 16 are spaced one from the other corresponding with the separation distance between two datum points, and are aligned with the datum points which each represent as illustrated at 55 and 56 in Fig. 3. The plotter arm slide 21 may now be moved longitudinally relative to arms 15 and 16 to begin locating the depth and angle of the subsurface strata which gives rise to the reflection time at each datum point.

The levers 38 are moved to "operating" position 38' so that the slide 21 may be moved. The seismic survey of the area under study indicates the reflection time of various subsurface strata from each shot point whereby the members 23 and 24 may be moved to a position on arms 16 and 15 adjacent the scales 45 and 46 thereof which corresponds to the reflection time of the seismic event at each shot point 55 and 56 in relation to the reflection under study. The member 23 is clamped in position on the member 16 adjacent the time read on the scale 46 which corresponds to the reflection time interval below datum point or shot point 55 giving rise to the particular reflection under study. The time interval of the same reflection below the second shot point or datum point 56 is then set on scale 45 of arm 15.

If there is a variation in the time interval between the two datum points to the reflection under study, the arms 15 and 16 must flex to accommodate proper positioning of the slide 21 adjacent the time on each of the scales 45 and 46 of each arm 15 and 16. The flexing of the arms 15 and 16 is illustrated in Fig. 2 wherein the slide means 21 has been adjusted to the reflection times for each shot point 55 and 56 and the reference point under study. Such flexing of arms 15 and 16 may cause them to move slightly out of alignment with the shot points 55 and 56 in datum plane 47, and the frame 4 and connected plotter arms 15 and 16 may be moved so as to realign the shot points 55 and 56 with each of the arms 15 and 16 respectively without disturbing the longitudinal position of the slide 21 on said arms by rotating bars 7 and 8 in the supports 9 and 10 as shown in Figs. 1 and 3. This introduces the desired corrections in the final position of the slide 21. The depth of the reflecting subsurface strata may be read from the depth scale on the coordinate paper 13, and the inclination of the base 22 will correspond with the angle or slope of the subsurface strata or reflecting interface which gave rise to the reflection under study. The dotted lines 70, 71 and 72 on Fig. 3 illustrates plots of subsurface strata.

The flexible arms 15 and 16 simulate the sound path or ray path in the earth and maintain the slide 21 in a right angular relationship relative to each of such arms so as to properly locate the position of the subsurface strata giving rise to the reflections at each of the shot points as well as the depth thereof. Spacers 73 may be used to maintain the proper distance between plotter arms 15 and 16 throughout their longitudinal length as they are bent or flexed. Since a plurality of reflecting surfaces are generally found, the instrument may be used to plot the angle and location of all such reflecting surfaces without the necessity of moving the instrument to new shot points. Of course, the length of subsurface strata giving rise to the reflections may be determined by moving the instrument to other shot points along the datum line 47 so that the reflection time from such shot points to the particular reflection under study may be set on the scales 45, 46 so as to position the slide means 21 relative to the arms 15 and 16 whereby the depth and angle may be plotted.

Since the earth is not homogeneous, the sound wave or ray path will likely never be in a straight line, but more often will be curved in a manner illustrated by the flexible arms 15 and 16. Therefore, the present invention takes into consideration automatically, a common non-homogeneous characteristic of the earth and provides an instrument which automatically compensates so as to correctly position a subsurface reflecting strata as to depth and time.

An alternate form of the slide 21 is illustrated in Fig. and is shown as including a body 60 which is provided with openings 61 and 62 for receiving arms 15 and 16 respectively. The form of the slide illustrated in Fig. 9 may be clamped to each of arms 15 and 16 by means of the threaded bolts 63 and 64, so as to position such slide on the arms adjacent scales 45 and 46 corresponding to the time interval of a reflection at each datum point 55 and 56.

In Fig. 10, the invention is illustrated wherein it is used to plot seismic ray paths. Heretofore, it has been necessary to plot seismic ray paths by a complicated mathematical formula well known in the art. However, the present invention plots ray paths without the use of such formula.

To use the instrument to plot the ray paths, it is mounted on a drafting table as previously described. The bars 5 and 6 are raised or lowered until the frame or bar 4 is spaced above the reference or datum line 47, a distance depending upon the constants in the velocity distribution function of the earth in the area under study. Such constants may be arrived at by any suitable well known method such as by measuring the uphole time of a seismic event in the given area under study. From such information the velocity variation of sound with depth in the earth in the general area under consideration may be determined.

In actual practice, the distance of the arm 4 above the datum plane 47 will correspond to the ratio of $V_0$ to $k$ in the equation $V = V_0 + kZ$, where $V_0$ equals the instantaneous speed near the earth's surface, $k$ represents the rate of acceleration and $Z$ equals depth.

Where the device is used to plot ray paths, the wave fronts 90 may first be plotted and drawn on the coordinate paper 91. Since such plotting may be accomplished by any means well known in the art, it is believed unnecessary to give a detailed description herein.

Also, the paper 91 is divided into a time-depth scale as illustrated at 92. Such scale may be plotted by means well known in the art by the function as previously discussed herein.

The plotter arms 15 and 16 are spaced one from the other corresponding with the separation distance between two datum points, and are aligned with the datum points 94 and 95 on the reference plane 47. Normally, 100 milli-seconds is the maximum time differential curvature of a ray path between adjacent shot points or datum points and this may be represented on each of the arms 15 and 16 in any one of several ways so as to effect flexing thereof to plot the simulated ray path curvature.

For example, depth scales 96 and 96' may be placed on the side of each plotter arm, with zero depth being at the reference points 94 and 95. The scales 96 and 96' may be in even units to any desired depth such as that depth shown on paper 91, or deeper if necessary. The depth on the scale 92 of coordinate paper 91 at, for example, 3.6 seconds time may be noted and the plotter arm slide means 21 positioned on the arm 16 at a depth on scale 96' thereof corresponding to the reading of depth at 3.6 seconds on coordinate paper 91. Then, since the maximum curvature of a ray path ordinarily encountered is 100 milli-seconds time differential between adjacent datum points, such as 94 and 95, the distance or depth at 3.5 seconds is noted from time-depth scale 92 on coordinate paper 91 and this distance is set on scale 96 of arm 15. This will cause flexing of the arms 15 and 16 as illustrated at 97. If the arms 15 and 16 move out of alignment with reference points 94 and 95 when they are flexed, the apparatus may be moved to re-align each arm with its reference point. The line 98 may then be plotted midway of, and parallel to, the arms 15 and 16 to simulate a ray path. The ray paths are arcs of circles and the arms 15 and 16 flex to simulate such paths whereby they may be plotted on coordinate paper 91.

In a similar manner, ray paths at differentials of ten milli-seconds each between the datum points may be plotted on the coordinate paper 91 as illustrated at 99.

If the arms 15 and 16 are already provided with the time-depth scales 45 and 46 respectively, then the plotter arm slide may be located on each arm 15 and 16 adjacent a time so that the time differential between the two arms or datum points which they represent as read on the scales of such arms is 100 milli-seconds. After plotting the position of the ray path, as illustrated at 98, then the ray paths for 10 milli-second intervals or differentials between the datum points may be plotted on the coordinate paper 91 as illustrated at 99.

The spacers 73 may be used to maintain the arms 15 and 16 the same distance apart throughout their length, corresponding with the separation distance between adjacent reference points 94 and 95.

If desired the arms 15 and 16 may be used as the aligning edge to plot the ray paths on the coordinate paper.

Broadly the invention relates to an apparatus for plotting seismic events and more particularly to an apparatus for plotting the depth and angle of reflecting subsurface strata and for plotting seismic ray paths.

What is claimed is:

1. An apparatus for plotting depth and dip of subsurface reflecting interfaces comprising a frame, two bars pivotally connected to said frame and supporting it, a pair of elastic plotter arms secured to said frame at a distance one from the other corresponding with the separation distance between two datum points, each of said arms having time-depth scales on which may be read the time interval of a reflection at each datum point, a plotter arm slide extending between said arms and movable along each arm, clamp means for holding said slide at a position on each of said arms with respect to said scales corresponding with said time intervals, said slide acting to bend said arms in arcs of circles along their longitudinal axis when it is clamped in position corresponding to said time intervals to thereby position said slide as to angle and depth of the subsurface reflecting interface which gave rise to said time intervals.

2. An apparatus for plotting depth and dip of subsurface reflecting interfaces comprising a frame, a pair of elastic plotter arms secured to said frame at a distance one from the other corresponding with the separation distance between two datum points, each of said arms having time-distance scales on which may be read the time interval of a reflection at each datum point, a plotter arm slide extending between said arms and movable along each arm, clamp means for holding said slide at a position on each of said arms with respect to said scales corresponding with said time intervals, said slide acting to bend said arms in arcs of circles along their longitudinal axis when it is clamped in position corresponding to said time intervals to thereby position said slide as to angle and depth of the subsurface reflecting interface which gave rise to said time intervals, and means pivotally supporting said frame whereby said frame and connected plotter arms may be moved about said support without disturbing the position of said slide on said arms for introduction of desired corrections in the final position of said slide.

3. An apparatus for plotting the location and dip of reflecting subsurface interfaces comprising a frame, a pair of elastic arms secured thereto at a distance one from the other corresponding with the separation distance between two datum points, each of said arms having time-distance scales on which may be read the time interval of a reflection at each datum point, and means extending between said arms and movable therealong for positioning with respect to said scales corresponding with the time intervals at each datum point whereby said arms are flexed in arcs of circles to thereby locate said means as to angle and depth of the subsurface reflecting interfaces which gave rise to said time intervals.

4. An apparatus for plotting the location and dip of reflecting subsurface interfaces comprising a frame, a pair of elastic arms, secured thereto at a distance one from the other corresponding with the separation distance between two datum points, each of said arms having time-distance scales on which may be read the time interval of a reflection at each datum point, means extending between said arms and movable therealong for positioning with respect to said scales corresponding with the time intervals at each datum point whereby said arms are distorted in arcs of circles to thereby locate said means as to angle and depth of the subsurface reflecting interfaces which gave rise to said time intervals, and means pivotally supporting said frame whereby said frame and connected arms may be moved about said support without disturbing the position of said means on said arms for introduction of desired corrections in the final position of said means.

5. An apparatus for plotting the location and dip of reflecting subsurface formations comprising a frame, a pair of elastic arms secured at points thereto spaced in correspondence with the distance between seismic datum points, a scale on each of said arms calibrated in terms related to seismic reflection time, and a member slidably supported relative to said arms and coacting with both of said scales for positioning said member with reference to a seismic reflection time at the datum points, said member acting to bend said arms in arcs of circles when so positioned to locate said member as to angle and depth of the subsurface reflecting formation.

6. An apparatus for plotting the location and dip of reflecting subsurface formations comprising a frame, a pair of elastic arms secured at points thereto spaced in correspondence with the distance between seismic datum points, a scale on each of said arms calibrated in terms related to seismic reflection time, a member slidably supported relative to said arms and coacting with both of said scales for positioning said member with reference to a seismic reflection time at the datum points, said member acting to bend said arms in arcs of circles when so positioned to locate said member as to angle and depth of the subsurface reflecting formation, and means pivotally supporting said frame whereby said frame and connected arms may be moved about said support without disturbing the position of said member on said arms for introduction of desired corrections in the final position of said member.

7. An instrument for contour plotting of subsurface strata comprising a frame, a pair of elastic arms secured thereto at points spaced in correspondence with the distance between seismic datum, a scale on each of said arms calibrated in terms related to seismic reflection time, and means slidably engaging said arms for positioning on each of said scales with respect to the reflection time at each seismic datum, said arms being yieldable in curves along their longitudinal axis to maintain a right angular relationship between said means and each of said arms at their engagement.

8. An instrument for contour plotting of subsurface strata comprising a frame, a pair of elastic arms secured thereto with the distance between them corresponding with the separation distance between datum points, said arms being shaped to bend in curves along their longitudinal axis, a scale on each of said arms calibrated in terms related to seismic reflection time, and means engaging said arms for flexing them in curves whereby said means may be aligned at right angles to said arms at its engagement therewith and may be positioned on each of said scales with respect to the reflection time at each datum point.

9. An instrument for contour plotting of subsurface strata comprising a frame, a pair of elastic arms secured thereto with the distance between them corresponding with the separation distance between datum point, a scale on each of said arms calibrated in terms related to seismic reflection time, means engaging said arms for flexing them in arcs of circles whereby said means may be aligned at right angles to said arms at its engagement therewith and may be positioned on each of said scales with respect to the reflection time at each datum point, and means for moving said frame and connected arms without disturbing the position of said means on said arms for introduction of desired corrections in the final position of said means.

10. An instrument for plotting the location and dip of reflecting subsurface formations comprising a frame, a pair of elastic arms secured thereto with the distance between them corresponding with the distance between two datum points, each of said arms carrying scales of time-depth, said arms being shaped to bend in a curve along their longitudinal axis, a member extending between said arms and slidable relative to said arms, means for holding said member relative to one of said arms at a position corresponding to a seismic time interval, and additional means for holding said member relative to the other of said arms corresponding to a second seismic time interval, said member and holding means cooperating to flex said arms in curves whereby said member is positioned both as to depth and as to angle of reflecting formation which gave rise to the seismic time intervals.

11. An instrument for plotting the location and dip of reflecting subsurface formations comprising a frame, a pair of elastic arms secured thereto with the distance between them corresponding with the distance between two datum points, each of said arms carrying scales of time-depth, a member extending between said arms and slidable relative to said arms, means for holding said member relative to one of said arms at a position corresponding to a seismic time interval, and additional means for holding said member relative to the other of said arms corresponding to a second seismic time interval, said member and holding means cooperating a flex said arms in arcs of circles whereby said member is positioned both as to depth and as to angle of reflecting formation which gave rise to the seismic time intervals, and means for moving said frame and connected arms without disturbing the position of said member on said arms for introduction of desired corrections in the final position of said member.

12. An instrument for plotting the position of subsurface strata comprising, a frame, elastic arms secured thereto at a spaced distance corresponding with the distance between datum points, said arms being shaped to bend in curves along their longitudinal axis, a scale on each of said arms calibrated in terms related to seismic reflection time, and means for flexing said arms in curves whereby said means may be positioned on each of said scales with respect to the reflection time at each datum point to locate the subsurface strata which gave rise to the seismic reflection times.

13. An instrument for plotting the position of subsurface strata comprising a frame, at least one elastic arm secured thereto in relation to a datum point, said arm being shaped to bend in a curve along its longitudinal axis, a scale on said arm calibrated in terms related to seismic reflection time, and means for distorting said arm in a curve whereby said distorting means may be positioned on said scale on said arm in relation to the reflection time at said datum point to locate the subsurface strata which gave rise to the seismic reflection time.

14. An instrument for plotting a seismic ray path from datum points comprising a frame, elastic arms secured thereto at a spaced distance corresponding with the distance between datum points, said arms being shaped to flex in a curve along their longest axis, a scale on each of said arms calibrated in terms related to seismic reflection time, and means for flexing said arms in a curve whereby said means may be positioned on each of said scales at a time differential between the datum points of at least 100 milli-seconds to distort said arms to locate the seismic ray paths from the datum points.

15. An instrument for plotting a seismic ray path from datum points comprising a frame, elastic arms secured thereto at a spaced distance corresponding with the distance between datum points, a scale on each of said arms calibrated in terms related to seismic reflection time, and means for flexing said arms whereby said means may be positioned on each of said scales at a selected time differential between the datum points to distort said arms in curves to locate the seismic ray paths from the datum points.

16. An instrument for plotting a seismic ray path from datum points comprising a frame, elastic arms secured thereto at a spaced distance corresponding with the distance between datum points, a scale on each of said arms calibrated in terms related to depth, and means for flexing said arms in arcs of circles whereby said means may be positioned on each of said scales at a depth corresponding to a selected time interval between the datum points so as to distort said arms to locate the seismic ray paths from the datum points corresponding to the selected time interval.

17. An instrument for contour plotting of subsurface strata comprising a frame, a pair of elastic arms secured thereto with the distance between them corresponding with the separation distance between datum points, a scale on each of said arms calibrated in terms related to seismic reflection time, means engaging said arms, for flexing them in arcs of circles whereby said means may be aligned at right angles to said arms at its engagement therewith and may be positioned on each of said scales with respect to the reflection time at each datum point, and means for maintaining said arms spaced in accordance with the separation distance between them.

References Cited in the file of this patent

UNITED STATES PATENTS

| | | |
|---|---|---|
| 1,853,524 | Vigneron et al. | Apr. 12, 1932 |
| 2,034,350 | Mario | Mar. 17, 1936 |
| 2,206,162 | Clemm | July 2, 1940 |
| 2,217,720 | Anderson | Oct. 15, 1940 |
| 2,321,955 | Thurston et al. | June 15, 1943 |
| 2,535,220 | McGuckin | Dec. 26, 1950 |

FOREIGN PATENTS

| | | |
|---|---|---|
| 395,162 | France | Dec. 19, 1908 |